(12) United States Patent
Zheng et al.

(10) Patent No.: US 6,758,054 B2
(45) Date of Patent: Jul. 6, 2004

(54) DUAL EVAPORATOR AIR CONDITIONING SYSTEM AND METHOD OF USE

(75) Inventors: Jing Zheng, Williamsville, NY (US); Prasad Shripad Kadle, East Amherst, NY (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/299,742

(22) Filed: Nov. 19, 2002

(65) Prior Publication Data

US 2004/0093880 A1 May 20, 2004

(51) Int. Cl.[7] ............................. F25B 5/00; F25B 41/00
(52) U.S. Cl. ........................................... 62/199; 62/513
(58) Field of Search ........................... 62/199, 513, 180, 62/244; 165/203, 207

(56) References Cited

U.S. PATENT DOCUMENTS

| | | | |
|---|---|---|---|
| 4,570,450 A | * | 2/1986 | Takemi et al. ............... 62/199 |
| 4,949,779 A | | 8/1990 | Kenny et al. ................. 165/2 |
| 5,142,881 A | | 9/1992 | Nagayama ................. 62/228.5 |
| 5,235,820 A | * | 8/1993 | Radermacher et al. ......... 62/114 |
| 5,678,419 A | | 10/1997 | Sanada et al. ................. 62/205 |
| 6,266,967 B1 | * | 7/2001 | Honda ......................... 62/193 |
| 6,655,163 B1 | | 12/2003 | Scherer et al. |

FOREIGN PATENT DOCUMENTS

| | | |
|---|---|---|
| DE | 20022757 | 2/2002 |
| EP | 0842798 | 5/1998 |

* cited by examiner

Primary Examiner—Chen Wen Jiang
(74) Attorney, Agent, or Firm—Patrick M. Griffin

(57) ABSTRACT

A dual evaporator air conditioning system and method for use therewith is provided to cool air in front and rear portions of a cabin of a vehicle. The dual evaporator air conditioning system includes primary and auxiliary HVAC units having primary and auxiliary evaporators, respectively, to cool the air in the front and rear portions of the cabin. A heat exchanger near the auxiliary evaporator warms the refrigerant in the auxiliary evaporator to maintain a minimum temperature. The heat exchanger warms the refrigerant in the auxiliary evaporator to prevent accumulation of liquid refrigerant and lubricating oil in the auxiliary evaporator when the auxiliary HVAC unit is in a non-cooling mode while the primary HVAC unit is in a cooling mode.

28 Claims, 6 Drawing Sheets

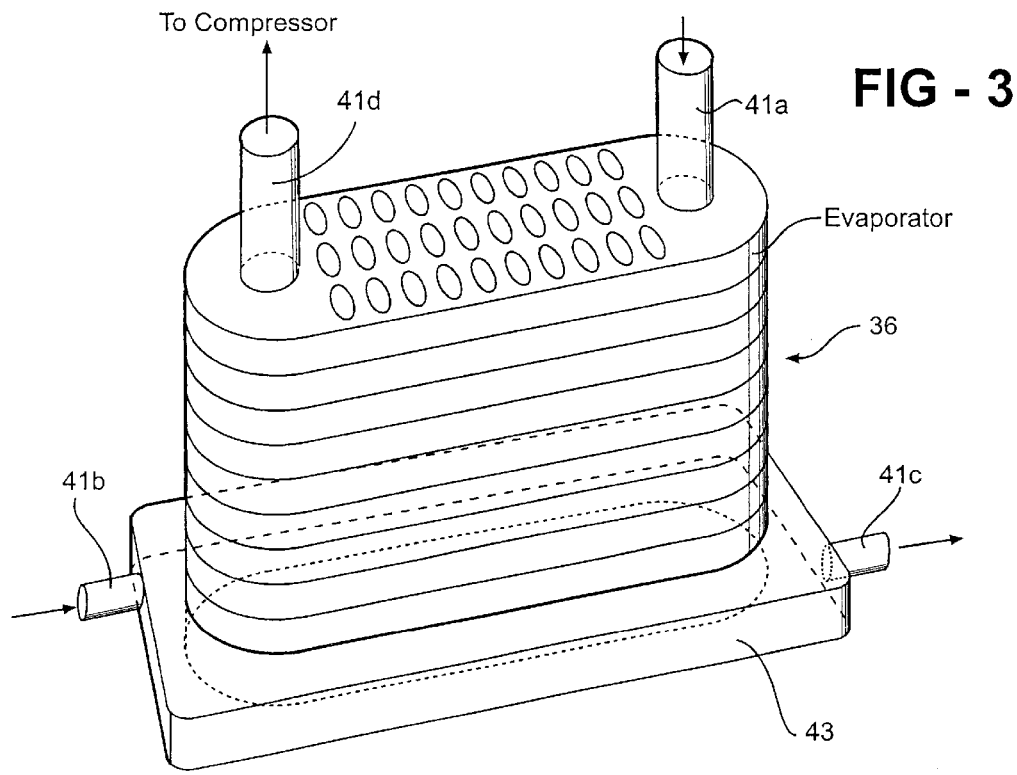
FIG - 3
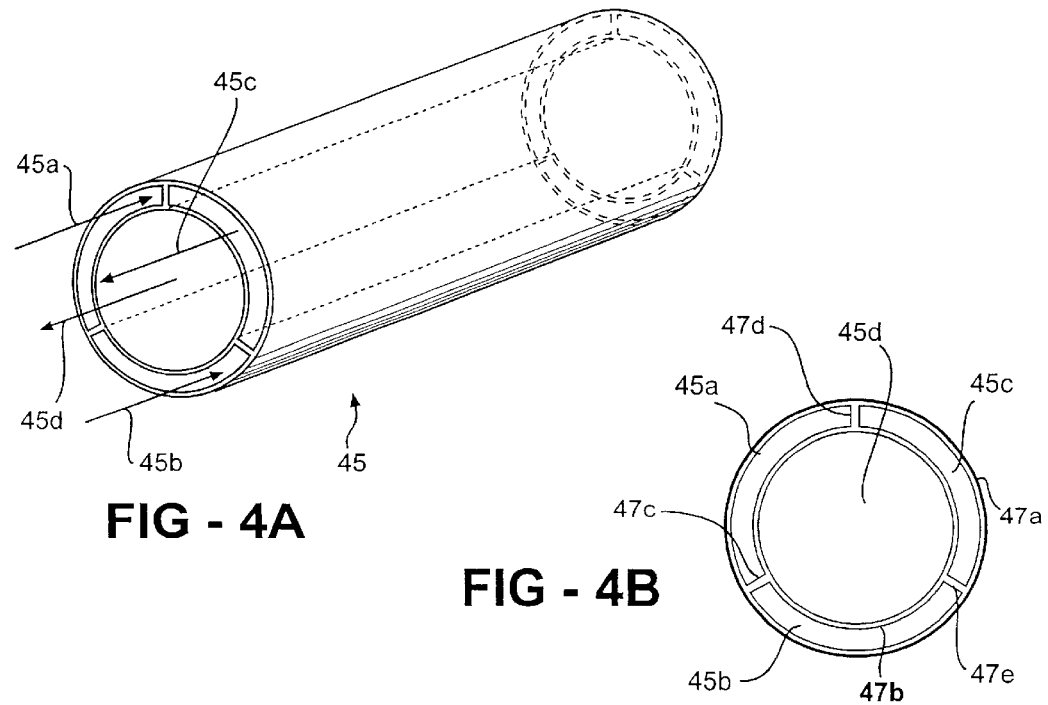
FIG - 4A
FIG - 4B

DUAL EVAPORATOR AIR CONDITIONING SYSTEM AND METHOD OF USE

FIELD OF THE INVENTION

The present invention relates to a dual evaporator air conditioning system for cooling air in a cabin of a vehicle and a method of cooling the air using the dual evaporator air conditioning system. More specifically, the present invention relates to the dual evaporator air conditioning system having primary and auxiliary HVAC units to cool the air in the front and rear portions of the cabin and the method of cooling the air in the front and rear portions of the cabin using the dual evaporator air conditioning system.

BACKGROUND OF THE INVENTION

Dual evaporator air conditioning systems are well known in the art for cooling air in front and rear portions of a cabin of a vehicle. A typical dual evaporator air conditioning system includes a primary HVAC unit to cool the front portion of the cabin and an auxiliary HVAC unit to cool the rear portion of the cabin. The primary HVAC unit includes a primary evaporator and the auxiliary HVAC unit includes an auxiliary evaporator. The primary and auxiliary evaporators are fluidly connected to a common compressor and common condenser. The compressor compresses and circulates refrigerant to the condenser. The condenser cools and condenses the refrigerant, which is then circulated to both the primary and auxiliary evaporators.

The primary evaporator is held by a primary housing and is used to transfer heat from the air to the refrigerant. A primary blower moves the air across the primary evaporator, and a plurality of primary air ducts direct the air into the front portion of the cabin. The auxiliary evaporator is held by an auxiliary housing and is used to transfer heat from the air to the refrigerant. An auxiliary blower moves the air across the evaporator, and a plurality of auxiliary air ducts direct the air into the rear portion of the cabin.

Examples of dual evaporator air conditioning systems are shown in U.S. Pat. No. 4,949,779 to Kenny et al. (the '779 patent) and U.S. Pat. No. 5,142,881 to Nagayama (the '881 patent). The dual evaporator air conditioning systems of the '779 and the '881 patents include primary and auxiliary evaporators connected to a common compressor to cool front and rear portions of a vehicle cabin.

Dual evaporator air conditioning systems of the prior art utilize a control system to control operation of the compressor and the primary and auxiliary HVAC units to cool the front and rear portions of the cabin. Generally, the control system activates the compressor when the primary HVAC unit is in a cooling mode, i.e., a user has requested cooled air for the front portion of the cabin. The auxiliary HVAC unit can also be in a cooling mode, i.e., the user has requested cooled air for the rear portion of the cabin. Alternatively, the auxiliary HVAC unit can remain in a non-cooling mode while the primary HVAC unit is in the cooling mode, i.e., the user has requested cooled air for the front portion, but not for the rear portion. In this instance, the compressor continues to circulate refrigerant through the auxiliary evaporator of the auxiliary HVAC unit even though the auxiliary HVAC unit is in the non-cooling mode. In such a case, liquid refrigerant and lubricating oil begin to accumulate in the auxiliary evaporator.

The liquid refrigerant and lubricating oil become stored or trapped in the auxiliary evaporator because the auxiliary evaporator is not transferring heat from the air in the rear portion of the cabin to the refrigerant in the auxiliary evaporator. As a result, the refrigerant is not converted to a vapor and the viscosity of the refrigerant in the auxiliary evaporator increases. As the viscosity of the refrigerant increases, more and more lubricating oil becomes trapped in the refrigerant to remain in the auxiliary evaporator. Accumulation of the liquid refrigerant and lubricating oil in the auxiliary evaporator results in refrigerant starvation to the rest of the system and poor compressor lubrication.

When liquid refrigerant is stored in the auxiliary evaporator, refrigerant for the rest of the dual evaporator air conditioning system is reduced. If the amount of liquid refrigerant that is stored is greater than a reserve charge, the primary evaporator will operate at a sub-critical charge. Furthermore, when lubricating oil is trapped in the auxiliary evaporator, the compressor does not receive adequate lubrication resulting in wear and tear of the compressor's internal components. Prior art dual evaporator air conditioning systems attempt to alleviate the buildup of the liquid refrigerant and lubricating oil in the auxiliary evaporator by adding a valve upstream of the auxiliary evaporator. The valve is closed when the auxiliary HVAC unit is in the non-cooling mode and open when the auxiliary HVAC unit is in the cooling mode. Such valves are relatively expensive, and require considerable attention and maintenance to ensure proper operation. As a result, there is a need in the art for an improved, economically feasible system to minimize refrigerant collection in the auxiliary evaporator.

SUMMARY OF THE INVENTION AND ADVANTAGES

The present invention provides a dual evaporator air conditioning system for use with a refrigerant for cooling air. The dual evaporator air conditioning system includes a compressor to compress and circulate the refrigerant through a primary air conditioning unit and an auxiliary air conditioning unit. A condenser condenses the refrigerant from the compressor. The primary air conditioning unit includes a primary evaporator to transfer heat from the air to the refrigerant to cool the air. The auxiliary air conditioning unit includes an auxiliary evaporator to transfer heat from the air to the refrigerant to cool the air. A heat exchanger is near the auxiliary evaporator to warm the refrigerant in the auxiliary evaporator to prevent accumulation of liquid refrigerant and lubricating oil in the auxiliary evaporator.

A method of preventing accumulation of refrigerant in the auxiliary evaporator of the auxiliary air conditioning unit is also provided. The method includes the steps of operating the primary air conditioning unit in the cooling mode and operating the auxiliary air conditioning unit in the non-cooling mode while the primary air conditioning unit is in the cooling mode. The method continues by warning the refrigerant in the auxiliary evaporator when the auxiliary air conditioning unit is in the non-cooling mode while the primary air conditioning unit is in the cooling mode. This prevents accumulation of the liquid refrigerant and the lubricating oil in the auxiliary evaporator.

The present invention provides several advantages over the prior art. In particular, the heat exchanger of the present invention continuously warms the refrigerant in the auxiliary evaporator. With a continuous transfer of heat from the heat exchanger, the refrigerant in the auxiliary evaporator will be maintained above a minimum temperature thereby allowing the refrigerant to easily move through the auxiliary evaporator without being trapped therein. The result is a reduction in the amount of liquid refrigerant and lubricating oil stored or trapped in the auxiliary evaporator. In addition, the refrigerant in the auxiliary evaporator is warmed without impacting the overall thermal performance of the dual evaporator air conditioning system.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is a perspective view of an economizer engaging an auxiliary evaporator of the dual evaporator air conditioning system;

FIG. 4A is a perspective view of a four path tube;

FIG. 4B is a cross-sectional view of the four path tube;

DETAILED DESCRIPTION OF THE PREFERRED EMBODIMENT

Figure 1:
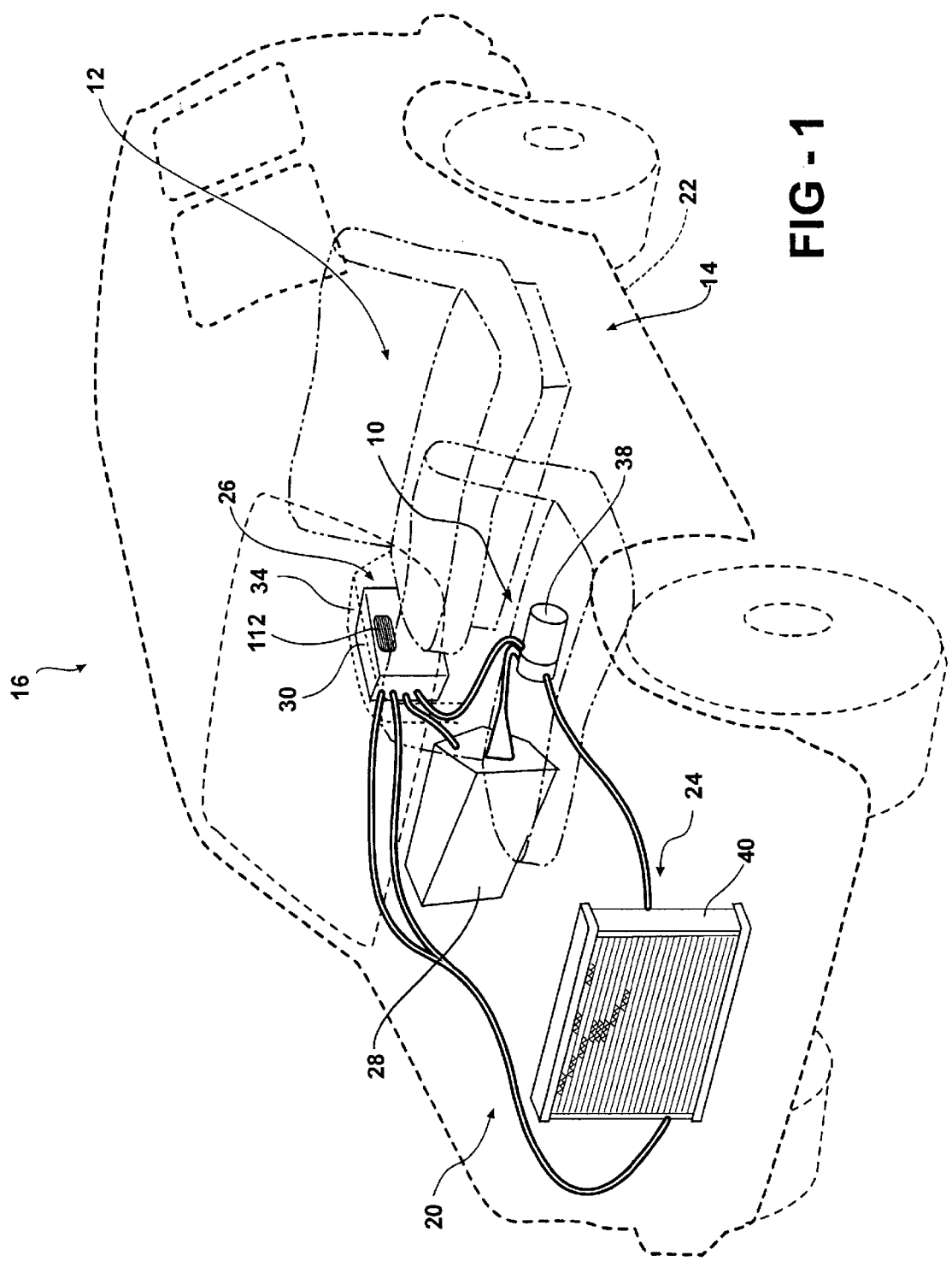
FIG. 1 is a perspective view of a vehicle having a dual evaporator air conditioning system of the present invention.

Referring to the Figures, wherein like numerals indicate like or corresponding parts throughout the several views, a dual evaporator air conditioning system for use with a refrigerant to cool air in front and rear portions 10,12 of a cabin 14 of a vehicle 16 is shown generally at 20. The dual evaporator air conditioning system 20, as depicted in FIG. 1 is positioned in a vehicle body 22 of the vehicle 16. The vehicle body 22 defines the front and rear portions 10,12 of the cabin 14 of the vehicle 16.

Figures 2, 6:
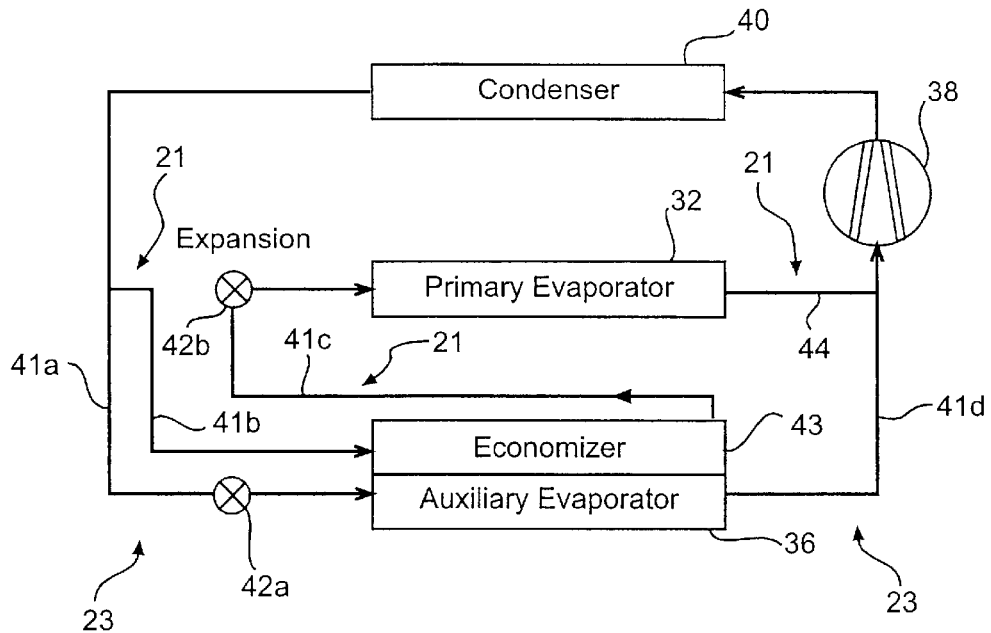
FIG. 2 is a schematic view of the dual evaporator air conditioning system.
FIG. 6 is a schematic view of an alternative dual evaporator air conditioning system.

Referring to FIGS. 1 and 2, the dual evaporator air conditioning system 20 works to cool the air in the front and rear portions 10,12 of the cabin 14 by circulating the refrigerant in a refrigerant circuit or cycle having parallel primary and auxiliary loops 21,23 to absorb heat from the air. The dual evaporator air conditioning system 20 comprises a primary HVAC unit 28 and an auxiliary HVAC unit 30. The primary HVAC unit 28 is preferably positioned in the vehicle 16 near the front portion 10 of the cabin 14. The primary HVAC unit 28 includes a primary evaporator 32 in the primary loop 21 of the refrigerant cycle to cool the air in the front portion 10 of the cabin 14. The primary HVAC unit is disposed in the vehicle body 22 of the vehicle 16 near an engine compartment 24.

The auxiliary HVAC unit 30 is preferably positioned in the vehicle 16 near the rear portion 12 of the cabin 14. The auxiliary HVAC unit 30 is disposed in a chamber 26 defined by the vehicle body 22. The chamber 26 is separate from the front and rear portions 10,12 of the cabin 14. In particular, the chamber 26 is partitioned from the rear portion 12 of the cabin 14 by interior molding 34. Preferably, the interior molding 34 is an inner side panel in the rear portion 12 with the chamber 26 being set back and partially sealed behind the side panel. The shape of the chamber 26 is similar to the auxiliary HVAC unit 28 to reduce size requirements. The auxiliary HVAC unit 30 includes an auxiliary evaporator 36 in the auxiliary loop 23 of the refrigerant cycle to cool the air in the rear portion 12 of the cabin 14.

Still referring to FIGS. 1 and 2, a compressor 38 is in fluid communication with both the primary and auxiliary evaporators 32,36. The compressor 38 is disposed within the vehicle body 22 of the vehicle 16 to compress and circulate the refrigerant in the primary and auxiliary loops 21,23 of the refrigerant cycle. The type of refrigerant used with the dual evaporator air conditioning system 20 of the present invention is preferably one that exhibits efficient heat transfer rates while being environmentally friendly. The refrigerant used with the dual evaporator air conditioning system 20, however, is not intended to limit the present invention.

A condenser 40 is disposed within the vehicle body 22 and in the refrigerant cycle to receive the compressed refrigerant from the compressor 38. The refrigerant entering the condenser 40 from the compressor 38 is generally in the form of a gas. The condenser 40 then cools and condenses the refrigerant. The refrigerant exits the condenser 40 as a high-pressure liquid and is split into first and second condensed refrigerant lines 41a,41b of the auxiliary and primary loops 23,21, respectively. In the first condensed refrigerant line 41a, the refrigerant travels to a first expansion device 42a upstream of the auxiliary evaporator 36. In the second condensed refrigerant line 41b, the refrigerant travels to a heat exchanger 43, hereinafter referred to as an economizer 43, which will be described in more detail below. From the economizer 43, the refrigerant travels through a heat exchanger exit line 41c of the primary loop 21 to a second expansion device 42b upstream of the primary evaporator 32.

The expansion devices 42b,42a upstream of the primary and auxiliary evaporators 32,36 expand the refrigerant from the economizer 43 and condenser 40, respectively, to provide the primary and auxiliary evaporators 32,36 with a low quality vapor. The expansion devices 42a,42b are in operative communication with the first condensed refrigerant line 41a and the heat exchanger exit line 41c, respectively.

It should be appreciated by those skilled in the art, that the compressor 38 and condenser 40 are common to both HVAC units 28,30, i.e., one compressor 38 and one condenser 40 are used in the refrigerant cycle.

The refrigerant is converted from a low quality vapor to a high quality vapor or gas in the primary and auxiliary evaporators 32,36. From the auxiliary evaporator 36, the gas refrigerant travels through an auxiliary evaporator exit line 41d of the auxiliary loop 23 back to the compressor 38 to begin the cycle again. From the primary evaporator 32, the refrigerant travels through a primary evaporator exit line 44 of the primary loop 21 to an accumulator-dehydrator canister 48 (not shown in FIG. 2) to separate any liquid refrigerant from the vapor refrigerant and then back to the compressor 38 to begin the cycle again.

Lines 41a–41d which enter and exit the auxiliary evaporator 36 and economizer 43 and the primary evaporator exit line 44 which exits the primary evaporator 32 can be formed of a thermally conductive material. In addition, referring to FIGS. 4A, and 4B, a four path tube 45 can be used to combine lines 41a–41d into one structure.

The four path tube 45 can be an extruded material defining four separate paths 45a–45d for conveying liquid and gas refrigerant. In particular, the four path tube 41 defines a first outer path 45a for conveying liquid refrigerant from the condenser 40 to the auxiliary evaporator 36, a second outer path 45b for conveying liquid refrigerant from the condenser 40 to the economizer 43, a third outer path 45c for conveying liquid refrigerant from the economizer 43 to the expansion device 42b, and a primary central path 45d for conveying gas refrigerant from the auxiliary evaporator 32 to the compressor 38. Each of the paths 45a–45d are separated by walls such that no two paths are fluidly connected. Specifically the paths 45a–45d are separated by an outer wall 47a, an inner wall 47b that is concentric with the outer wall 47a, and three radially extending walls 47c–47e interconnecting the inner 47b and outer 47a walls. It should be appreciated that the primary central path 45d of the four path tube 45 is larger than each of the other outer paths 45a–45c. This is to ensure a minimum pressure drop of refrigerant gas from the auxiliary evaporator 36 to the compressor 38.

It should be appreciated that the refrigerant cycle is generally illustrated and is not intended to limit the present invention. For example, the dual evaporator air conditioning system 20 may be configured without the accumulator-dehydrator canister, but with a receiver when a thermal expansion valve is employed.

The primary evaporator 32 is a heat exchanger that transfers heat from the air in the front portion 10 of the cabin 14 to the refrigerant that is circulating through the refrigerant cycle. The primary evaporator 32 cools the air for the front portion 10 of the cabin 14. A primary housing 50 surrounds the primary evaporator 32. As previously described, the refrigerant enters the primary evaporator 32 as a low quality vapor and exits as a high quality vapor or gas. A primary blower 52 is disposed in the primary housing 50 and engages the primary housing 50 to move the air from the front portion 10 of the cabin 14 across the primary evaporator 32 to transfer the heat from the air to the refrigerant. This movement of air is illustrated using arrows in FIG. 5.

Figure 5:
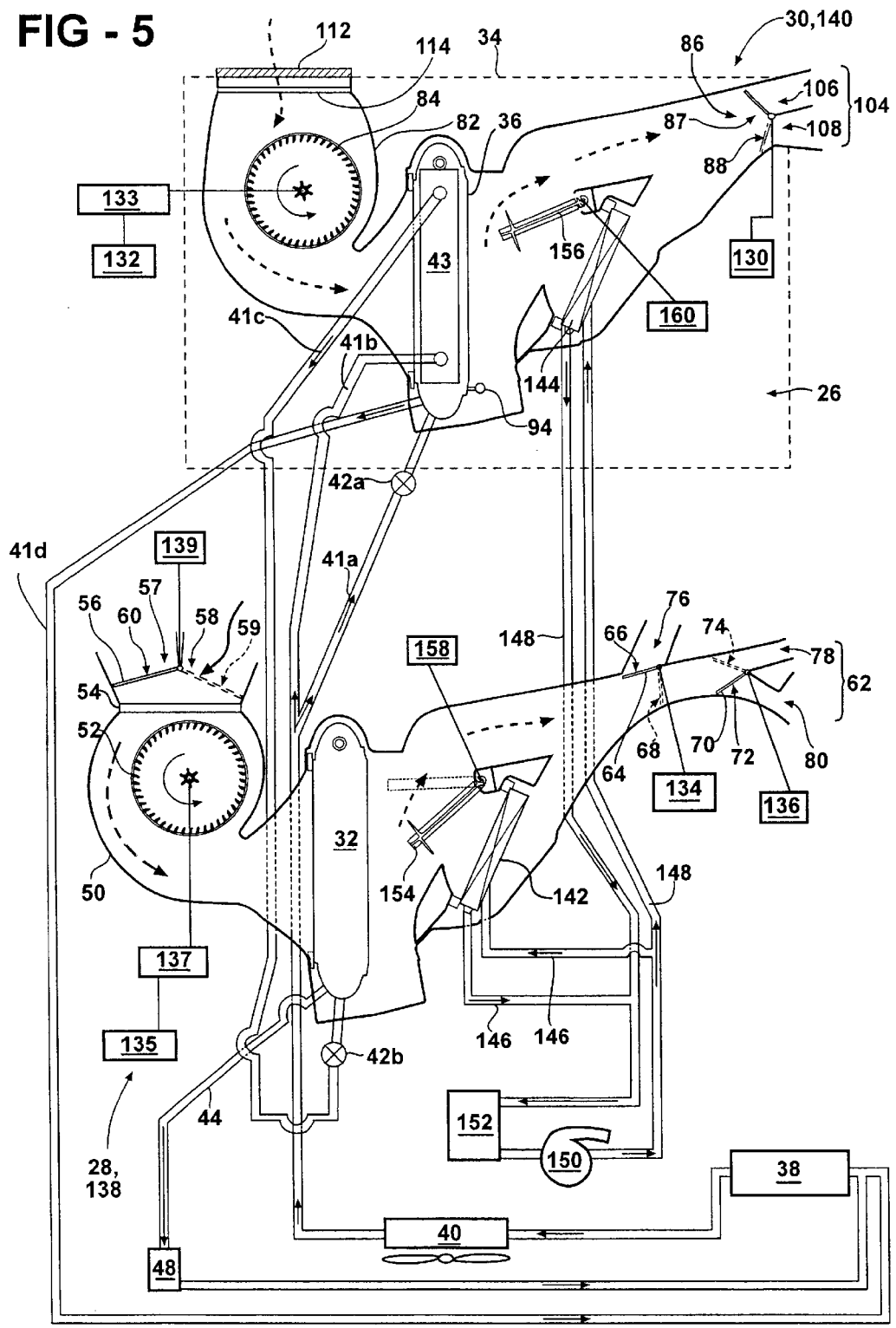
FIG. 5 is a cross-sectional and partially schematic view of the dual evaporator air conditioning system.

Alternatively, the primary blower 52 may receive air from outside the vehicle 16 that is first filtered through an intake filter 54 to be moved across the primary evaporator 32. It will be appreciated by those skilled in the art that the intake filter 54 is not necessary to draw outside air into the primary HVAC unit 28. Either outside air or the air from the front portion 10 of the cabin 14 can be cooled in the primary HVAC unit 28. Referring to FIG. 5, an intake door 56 can be used to switch between outside air and air from within the cabin 14. An outside air duct 58 and a return duct 60 are used to direct the air into the primary HVAC unit 28. The intake door 56 alternates between two positions 57,59 to switch between drawing outside air and drawing air from the cabin 14 into the primary housing 50. Regardless of the air source, the liquid refrigerant in the primary evaporator 32 begins to boil due to the heat in the air moving across the primary evaporator 32 (the refrigerant typically has a low boiling point). The refrigerant, therefore, changes phases, i.e., from the liquid refrigerant to the vapor refrigerant phase and absorbs heat from the air.

A plurality of primary air duct housings extend from and engage the primary housing 50 to define a plurality of primary air ducts 62 to distribute the air from the primary HVAC unit 28 into the front portion 10 of the cabin 14. The plurality of primary air ducts 62 is downstream of the primary evaporator 32, i.e., the air is cooled before reaching the primary air ducts 62. A first mode door 64 that is downstream of the primary evaporator 32 engages the primary housing 50 and is movable between first and second positions 66,68 to selectively distribute the air into the primary air ducts 62 to be distributed into the front portion 10 of the cabin 14. Preferably, the first mode door 64 pivots relative to the primary housing 50 to change the positions 66,68. A second mode door 70 engages the primary housing 50 and is movable between first and second positions 72,74 to selectively distribute the air into the primary air ducts 62 to be distributed into the front portion 10 of the cabin 14. Preferably, the second mode door 70 pivots relative to the primary housing 50 to change the positions 72,74.

The plurality of primary air ducts 62 include a primary defrost duct 76, a primary vent duct 78, and a primary floor duct 80. The first mode door 64 is upstream of the second mode door 70 and diverts cooled air to the primary defrost duct 76 in the second position 68 and closes the primary defrost duct 76 in the first position 66. The second mode door 70 diverts cooled air to the primary vent duct 78 in the first position 72 and to the primary floor duct 80 in the second position 74 (when the first mode door 64 is in the first position 66). It should be appreciated that the number of mode doors 64,70, or primary air ducts 62 used to divert the cooled air from the primary HVAC unit 28 is not intended to limit the present invention. It should be appreciated by those skilled in the art, that many different configurations could be utilized.

The auxiliary evaporator 36 is a heat exchanger that transfers heat from the air in the rear portion 12 of the cabin 14 to the refrigerant circulating through the refrigerant cycle. The auxiliary evaporator 36 cools the air for the rear portion 12 of the cabin 14. An auxiliary housing 82 surrounds the auxiliary evaporator 36. As previously described, the refrigerant enters the auxiliary evaporator 36 as a low quality vapor and exits as a high quality vapor. An auxiliary blower 84 is disposed in the auxiliary housing 82 and engages the auxiliary housing 82 to move the air from the rear portion 12 of the cabin 14 across the auxiliary evaporator 36 to transfer the heat from the air to the refrigerant. As a result, any liquid refrigerant in the auxiliary evaporator 36 begins to boil. The refrigerant, therefore, changes phases, i.e., from the liquid refrigerant to the vapor refrigerant phase thereby absorbing heat from the air.

An air intake vent 112, near the auxiliary housing 82, engages the interior molding 34 and operatively communicates with the rear portion 12 of the cabin 14. The air intake vent 112 guides the air from the rear portion 12 into the auxiliary housing 82 upstream of the auxiliary blower 84. An air filter 114 may be disposed between the air intake vent 112 and the auxiliary housing 82 to remove particles from the air.

A plurality of auxiliary air duct housings extend from and engage the auxiliary housing 82 to define a plurality of auxiliary air ducts 104 to distribute the cooled air into the rear portion 12 of the cabin 14. In the preferred embodiment, the plurality of auxiliary air ducts 104 include an auxiliary vent duct 106 and an auxiliary floor duct 108 communicating with the auxiliary housing 82 to distribute the air from the auxiliary HVAC unit 30 into the rear portion 12 of the cabin 14. An auxiliary mode door 86 engages the auxiliary housing 82 and is movable between first and second positions 87,88 to direct the cooled air into the rear portion 12 of the cabin 14. The first and second positions 87,88 correspond to vent and heater modes of the auxiliary HVAC unit 30. The first position 87 corresponds to discharging the cooled air through the auxiliary vent duct 106 and the second position 88 corresponds to discharging the cooled air through the auxiliary floor duct 108.

Referring to FIGS. 2, 3 and 5, the economizer 43 is disposed in the primary loop 21 of the refrigerant cycle between the condenser 40 and the primary evaporator 32. The economizer 43 is mounted to an end of the auxiliary evaporator 36 and partially surrounds the end of the auxiliary evaporator 36 to warm the refrigerant inside the auxiliary evaporator 36. Alternatively, the economizer 43 can be mounted to the auxiliary housing 82 adjacent to the auxiliary evaporator 36. In one embodiment, the economizer 43 uses refrigerant from the condenser 40 to warm the refrigerant inside the auxiliary evaporator 36. As previously discussed, the refrigerant exits the condenser 40 as a warm, high-pressure liquid. The refrigerant from the condenser 40 is split between the first and second condensed refrigerant lines 41a,41b. The second condensed refrigerant line 41b conveys the warm, liquid refrigerant to the economizer 43. Since the economizer 43 is a type of heat exchanger, the refrigerant flowing therein releases heat from the warm, liquid refrigerant of the economizer 43 to the refrigerant of the auxiliary evaporator 36 in a thermodynamic exchange. As a result, the refrigerant of the auxiliary evaporator 36 can be maintained above a minimum system temperature. By keeping the refrigerant in the auxiliary evaporator 36 above the lowest temperature that the refrigerant reaches in the system, liquid refrigerant and lubricating oil will not be stored or trapped within the auxiliary evaporator 36.

Once the refrigerant in the economizer 43 has released the heat to the refrigerant in the auxiliary evaporator 36, the refrigerant from the economizer 43 continues through the heat exchanger exit line 41c to the expansion device 42b and on to the primary evaporator 32. Hence, the refrigerant flowing in the refrigerant cycle must pass through the economizer 43 prior to entering the primary evaporator 32. Since the refrigerant from the economizer 43 is still in a condensed liquid form, yet at a lower temperature, the overall thermal performance of the dual evaporator air conditioning system 20 is not impacted. In fact, more refrigeration capacity is provided to the primary evaporator 32 due to the liquid subcooling of the refrigerant in the economizer 43.

The economizer 43 may extend across and/or cover the auxiliary evaporator 36, or alternatively, the economizer 43 may extend across only a portion of the auxiliary evaporator 36.

The economizer 43 may be insulated from the air stream within the auxiliary HVAC unit 30 by an insulator (not shown). The insulator can cover one side of the economizer 43 opposite the auxiliary evaporator 36 such that the heat from the economizer 43 is directed toward the auxiliary evaporator 36. The insulator may be comprised of a number of different insulating materials including, but not limited to fiberglass pulp, glass or porcelain, ceramic, ebonite, paraffin, rubber or plastic, metal wrapping, and the like. The insulator and the economizer 43 can be resistant to corrosion resulting from exposure to conditions within the auxiliary HVAC unit 30.

Figure 8:
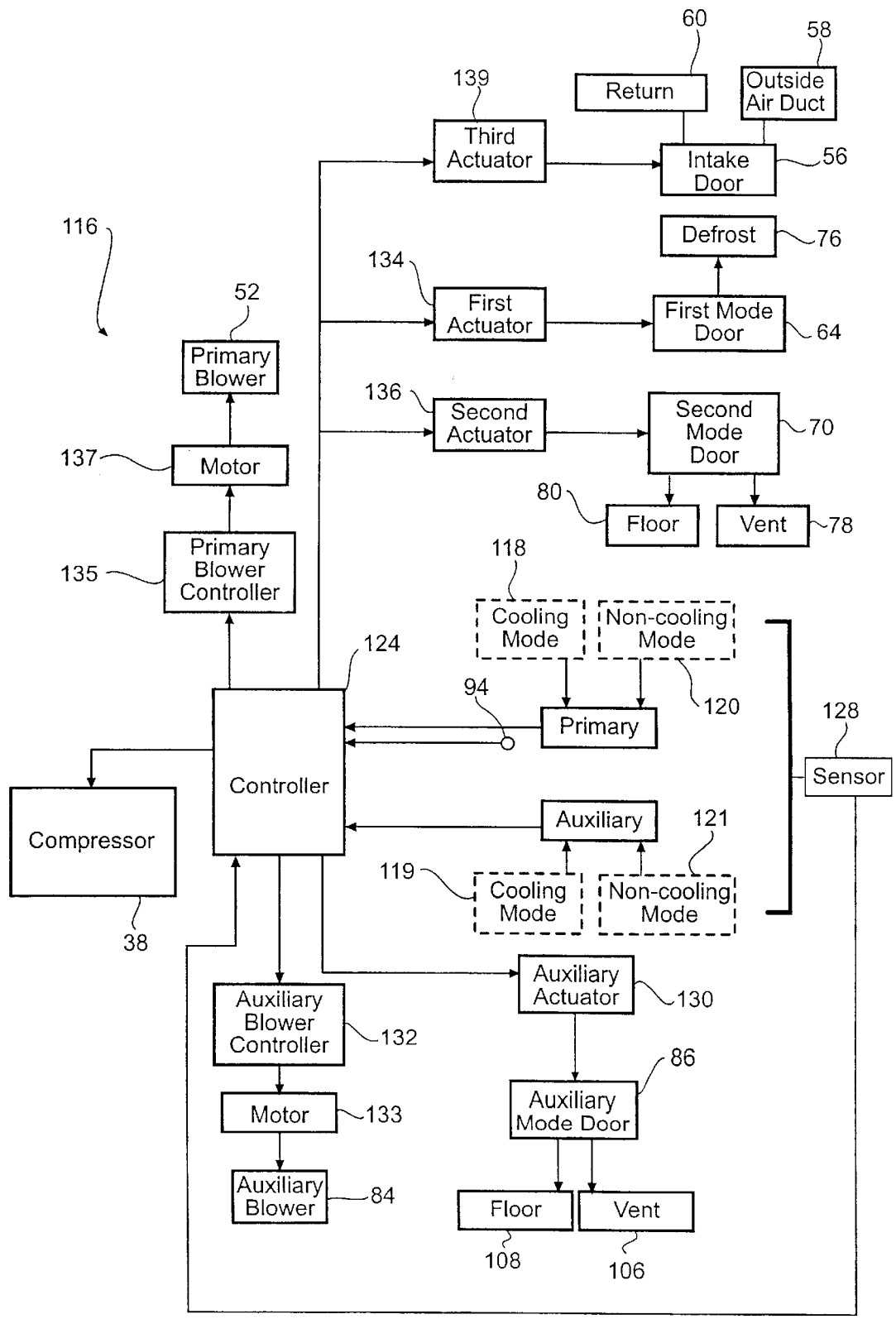
FIG. 8 is a block diagram illustrating a control system of the dual evaporator air conditioning system.

Referring to FIG. 8, the dual evaporator air conditioning system 20 includes a control system 116 having cooling and non-cooling modes 118,119,120,121 for each of the HVAC units 28,30 to control the dual evaporator air conditioning system 20. Preferably, the control system 116 includes a controller 124 centralized within the control system 116 to control the dual evaporator air conditioning system 20. The controller 124 utilizes input signals and control signals, as is well known in the art, to control the dual evaporator air conditioning system 20. It will be appreciated that the controller 124 is powered by a power source in the vehicle 16 such as a battery, power cell, power generator, or the like. A control panel (not shown) that is operatively connected to the controller 124 and accessible to a user of the vehicle 16 is used to control several features of the control system 116.

Preferably, the user controls whether the primary and auxiliary HVAC units 28,30 are placed in the cooling mode 118,119 or the non-cooling mode 120,121. The user selects the cooling or non-cooling mode 118,119,120,121 for each of the HVAC units 28,30 based on whether the user wishes to provide cooled air to the front and/or rear portions 10,12 of the cabin 14. Preferably buttons on the control panel, schematically represented in FIG. 8, are used to request the cooled air for the front and rear portions 10,12 of the cabin 14. Although FIG. 8 illustrates separate buttons for the cooling and non-cooling modes 118,119,120,121, it is preferable to utilize a single button for each of the primary and auxiliary HVAC units 28,30. In this manner, each air conditioning unit is placed in the cooling mode 118,119 when the user activates the corresponding button. Conversely, each HVAC unit 28,30 is placed in the non-cooling mode 120,121 when the user deactivates the corresponding button. Pressing the buttons sends input signals to the controller 124 to indicate the user's desired cooling conditions. The controller 124 then uses those input signals to control other aspects of the control system 116 as will be described further below.

The user also controls temperature settings for the front and rear portions 10,12 of the cabin 14 and primary and auxiliary blower speeds to temperately control the air in the front and rear portions 10,12. It should be appreciated by those skilled in the art that user control of the primary and auxiliary HVAC units 28,30 could be accomplished in several ways. Therefore, the specific manner in which the user controls the primary and auxiliary HVAC units 28,30 is not intended to limit the present invention.

Many features of the control system 116 are controlled automatically, i.e., control signals are automatically sent from the controller 124 in response to the input signals sent to the controller 124. For instance, the compressor 38 is automatically activated when the user has selected the cooling mode 118 for the primary HVAC unit 28. The compressor 38 then begins to automatically circulate refrigerant through the refrigerant cycle.

In one embodiment, the economizer 43 continuously circulates refrigerant from the condenser 40 to the auxiliary evaporator 36. Hence, the refrigerant in the auxiliary evaporator 36 is warmed by the economizer 43 regardless of whether the auxiliary HVAC unit 30 is in the cooling mode 119 or the non-cooling mode 121. When the user has selected the cooling mode 118 for the primary HVAC unit 28, a control signal is sent from the controller 124 to the compressor 38 and the compressor 38 is activated. The compressor 38 then begins to circulate refrigerant through the refrigerant cycle. This includes circulating refrigerant through both the primary and auxiliary evaporators 32,36 even though the user has selected the non-cooling mode 121 for the auxiliary HVAC unit 30. The primary blower 52 moves air across the primary evaporator 32 to transfer heat from the air to the refrigerant in the primary HVAC unit 28. However, since the user has selected the non-cooling mode 121 for the auxiliary HVAC unit 30, air is not moved across the auxiliary evaporator 36 to be cooled, i.e., the user has selected not to cool the rear portion 12 of the cabin 14. As a result, heat from the air is not transferred to the refrigerant. Therefore, the economizer 43 supplies the heat necessary to warm the refrigerant and prevent accumulation of liquid refrigerant and lubricating oil in the auxiliary evaporator 36, as previously described.

A temperature sensor 94, such as a thermocouple, may be positioned near the economizer 43 to determine the temperature of the economizer 43. The temperature sensor 94 is operatively connected to the controller 124 to relay the temperature of the economizer 43 or the auxiliary evaporator 36 back to the controller 124.

The control system 116 includes a sensor 128 that is operatively connected to the controller 124 to sense which mode 118,119,120,121 the primary and auxiliary HVAC units 28,30 are in. Specifically, the controller 124 is responsive to the sensor 128 to sense when the auxiliary HVAC unit 30 is in the non-cooling mode 121 while the primary HVAC unit 28 is in the cooling mode 118. The sensor 128 may represent computer code within the controller 124 that recognizes the input signals triggered by the user to determine when the auxiliary HVAC unit 30 is in the non-cooling mode 121 while the primary HVAC unit 28 is in the cooling mode 118.

The control system 116 includes an auxiliary blower controller 132 that is operatively connected to the controller 124. The auxiliary blower controller 132 actuates a motor 133 to rotate the auxiliary blower 84 when the auxiliary HVAC unit 30 is in the cooling mode 119. The auxiliary blower controller 132 is responsive to the controller 124 to operate the auxiliary blower 84 via the motor 133 at a user selected blower speed when the auxiliary HVAC unit 30 is in the cooling mode 119. The auxiliary blower controller 132 deactivates the auxiliary blower 84 when the auxiliary HVAC unit 30 is in the non-cooling mode 121 while the primary HVAC unit is in the cooling mode 118. In this manner, there is no air flow to the rear portion 12 of the cabin 14. It should be appreciated that the auxiliary blower controller 132 may be a separate component from the controller 124, or the auxiliary blower controller 132 may represent computer code within the controller 124. In other words, the controller 124 may be adapted to include the auxiliary blower controller 132.

The control system 116 includes a primary blower controller 135 that is operatively connected to the controller 124. The primary blower controller 135 actuates a motor 137 to rotate the primary blower 52. The primary blower controller 135 is responsive to the controller 124 to operate the primary blower 52 when the primary HVAC unit 28 is in the cooling mode 118. The primary blower 52 moves the cooled air into the front portion 10 of the cabin 14 when the primary HVAC unit 28 is in the cooling mode 118.

The control system 116 includes an auxiliary actuator 130 that is operatively connected to the controller 124. The auxiliary actuator 130 is responsive to the controller 124 to move or pivot the auxiliary mode door 86 between the first and second positions 87,88. The control system 116 includes a first actuator 134 that is operatively connected to the controller 124. The first actuator 134 is responsive to the controller 124 to move the first mode door 64 between the first and second positions 66,68. The control system 116 also includes a second actuator 136 that is operatively connected to the controller 124. The second actuator 136 is responsive to the controller 124 to move the second mode door 70 between the first and second positions 72,74. The control system 116 also includes a third actuator 139 operatively connected to the controller 124 to move the intake door 56 between the positions 57,59 corresponding to drawing in the outside air and drawing in the air from the front portion 10.

Figure 7:
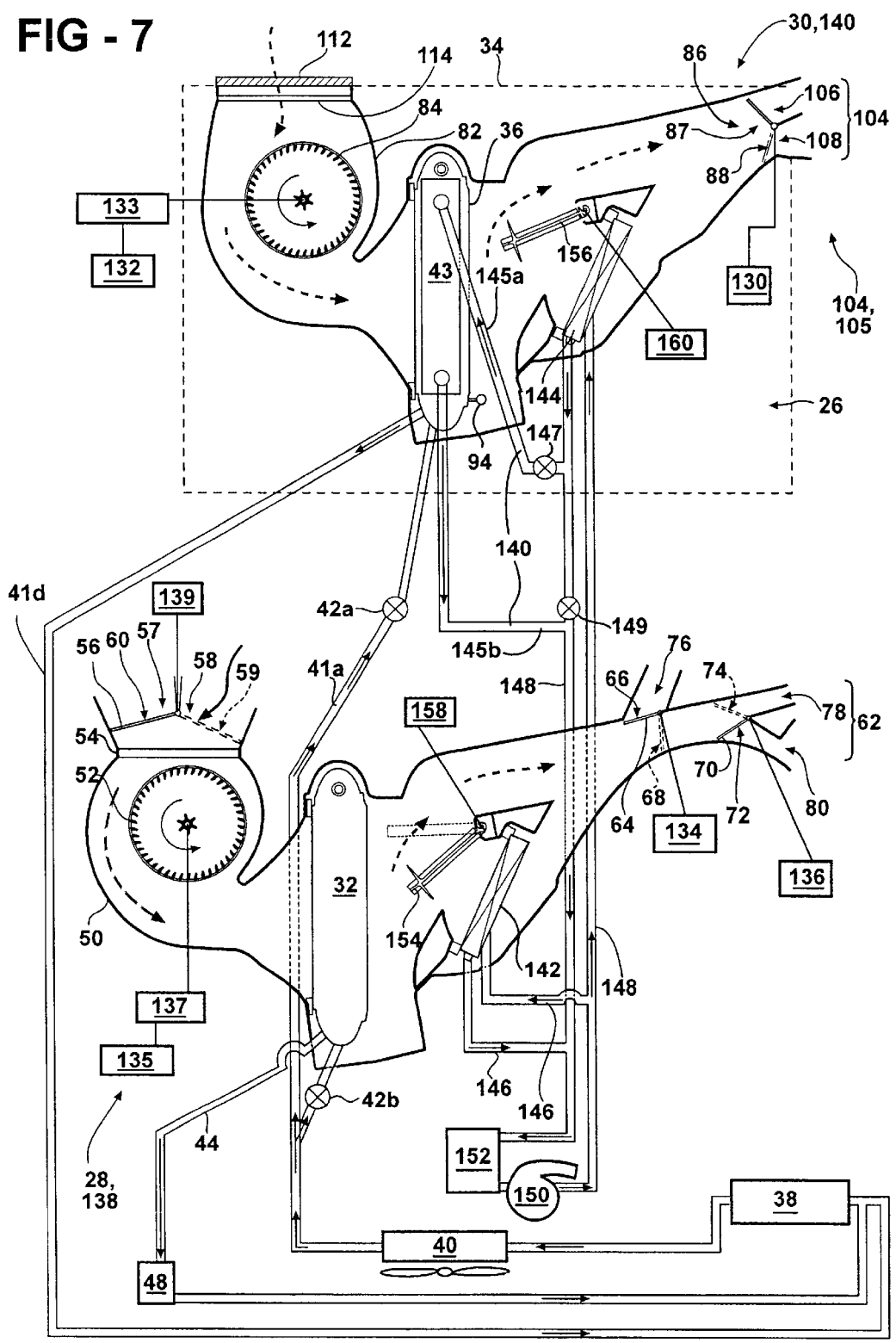
FIG. 7 is a cross-sectional and partially schematic view of the alternative dual evaporator air conditioning system.

Referring to FIGS. 5–7, the primary and auxiliary HVAC units 28,30 may include primary and auxiliary heater cores 142,144 in addition to the primary and auxiliary evaporators 32,36. It should be appreciated by those skilled in the art that some embodiments may provide primary and auxiliary air conditioning units 138,140 in lieu of primary and auxiliary HVAC units 28,30. The primary and auxiliary air conditioning units 138,140 have the evaporators 32,36 but not the heater cores 142,144. For clarity, the above description is directed toward the HVAC units 28,30. However, the primary and auxiliary air conditioning units 138,140 may be used interchangeably for the HVAC units 28,30. In this instance, the primary and auxiliary air conditioning units 138,140 include all of the features and perform all of the functions of the primary and auxiliary HVAC units 28,30, except that the primary and auxiliary air conditioning units 138,140 may not include heater cores 142,144.

The heater cores 142,144 are positioned in fluid communication with first and second coolant loops 146,148 of a coolant circuit or cycle. The first and second coolant loops 146,148 are parallel and interconnected and circulate coolant from an engine 152 through the heater cores 142,144. A pump 150, commonly referred to as a water pump 150 is used to circulate the coolant through the engine 152 of the vehicle 16 and into the first and second coolant loops 146,148, as is well known in the art.

In an alternative embodiment of the present invention, illustrated in FIGS. 6 and 7, the economizer 43 does not use the refrigerant from the condenser 40 to heat the refrigerant in the auxiliary evaporator 36. Instead, the coolant from the second coolant loop 148 is routed to the economizer 43 via a third coolant loop 140. Referring to FIGS. 6 and 7, after the coolant in the second coolant loop 148 exits the auxiliary heater core 144, the coolant travels to the third coolant loop 140 in series with the second coolant loop 148. A heat exchanger entrance line 145a extends from a first joint in the second coolant loop 148 downstream of the auxiliary heater core 144 to the economizer 43 to convey the coolant from the auxiliary heater core 144 to the economizer 43. A heat exchanger exit line 145b extends from the economizer 43 to a second joint to connect back to the second coolant loop 148 to be circulated back through the engine 152 and the water pump 150. A first valve 147 is seated in the heat exchanger entrance line 145a to regulate or control coolant flow between the auxiliary heater core 144 and the economizer 43. A second valve 149 is seated in the second coolant loop 148 between the first and second joints 141,143 to regulate or control coolant flow in the coolant loop.

The valves 147,149 may be controlled by the controller 124 based on input signals received from the sensor 128. For instance, the first valve 147 may be in a closed position and the second valve 149 may be in an open position when both the primary and auxiliary HVAC units 28,30 are in the cooling mode 118,119 such that the coolant does not flow through the economizer 43. In this condition, the third coolant loop 140 is effectively shut off from the second coolant loop 148. Conversely, the controller 124 via a solenoid or other actuating device may move the first valve 147 to an open position and the second valve 149 to a closed position when the primary HVAC unit 28 is in the cooling mode 118, while the auxiliary HVAC unit 30 is in the non-cooling mode 121. In this case, the coolant from the auxiliary heater core 144 is conveyed through the heat exchanger entrance line 145a to the economizer 43 to warm the refrigerant in the auxiliary evaporator 36.

The heater cores 142,144 are disposed within the primary and auxiliary housings 50,82 downstream of the primary and auxiliary evaporators 32,36. The heater cores 142,144 are separated from the evaporators 32,36 by primary and auxiliary air mixing doors 154,156. The air mixing doors 154,156 include actuators 158,160 that are controlled by the controller 124 to move the air mixing doors 154,156. Movement of the air mixing doors 154,156 is based on user-selected parameters such as temperature to control the temperature of the air entering the front and rear portions 10,12 of the cabin 14. The primary and auxiliary blowers 52,84 move the air from the front and rear portions 10,12, or alternatively, the primary blower 52 moves the outside air across the primary and auxiliary evaporators 32,36 and primary and auxiliary heater cores 142,144, depending on the positioning of the air mixing doors 154,156. The use and control of air mixing doors 154,156 to control air temperature are well known in the art and therefore, will not be described in detail.

An example of a method of cooling the air in the front and rear portions 10,12 of the cabin 14 of the vehicle 16 will now be described. It should be appreciated that the following example represents one of many ways in which the method of the present invention may be carried out.

The dual evaporator air conditioning system 20 of the present invention is used to prevent accumulation of refrigerant in the auxiliary evaporator 36 of the auxiliary HVAC unit 30 when the auxiliary HVAC unit 30 is in the non-cooling mode 121 while the primary HVAC unit 28 is in the cooling mode 118. In such an instance, the compressor 38 is compressing and circulating the refrigerant to both the auxiliary evaporator 36 of the auxiliary HVAC unit 30 and the primary evaporator 32 of the primary HVAC unit 28. A step to preventing accumulation of the refrigerant in the auxiliary evaporator 36 is warming the refrigerant in the auxiliary evaporator 36 when the auxiliary HVAC unit 30 is in the non-cooling mode 121 while the primary HVAC unit 28 is in the cooling mode 118. In the present invention, the refrigerant is warmed via the economizer 43 by using either refrigerant from the condenser 40 in the refrigerant cycle or coolant from the water pump 150 in the coolant loop.

It should be appreciated by those skilled in the air conditioning and refrigeration arts, that the dual evaporator air conditioning system 20 of the present invention may be employed in non-automotive applications. For example, refrigeration systems such as food display cases, and residential air conditioning systems (mini-split, wall mounted room air conditioning units) may interconnect multiple evaporators with a common compressor. Therefore, the dual evaporator air conditioning system 20 of the present invention may be utilized as such.

Obviously, many modifications and variations of the present invention are possible in light of the above teachings. The invention may be practiced otherwise than as specifically described within the scope of the appended claims.

What is claimed is:

1. A dual evaporator air conditioning system for use with a refrigerant for cooling air, said system comprising:
    a refrigerant circuit;
    a compressor in fluid communication with said refrigerant circuit for compressing and circulating the refrigerant;
    a condenser in fluid communication with said refrigerant circuit for condensing the refrigerant;
    a primary air conditioning unit operable between cooling and non-cooling modes and having a primary evaporator in fluid communication with said refrigerant circuit and a primary blower for moving the air across said primary evaporator in said cooling mode while discontinuing movement of the air across said primary evaporator in said non-cooling mode;
    an auxiliary air conditioning unit operable between cooling and non-cooling modes and having an auxiliary evaporator in fluid communication with said refrigerant circuit and an auxiliary blower for moving the air across said auxiliary evaporator in said cooling mode while discontinuing movement of the air across said auxiliary evaporator in said non-cooling mode; and
    a heat exchanger for warming the refrigerant in said auxiliary evaporator when said primary air conditioning unit is in said cooling mode while said auxiliary air conditioning unit is in said non-cooling mode to prevent accumulation of liquid refrigerant in said auxiliary evaporator.

2. A system as set forth in claim 1 wherein said heat exchanger is in fluid communication with said refrigerant circuit.

3. A system as set forth in claim 2 wherein said refrigerant circuit includes primary and auxiliary loops and said heat exchanger is in fluid communication with said primary loop of said refrigerant circuit downstream of said condenser and upstream of said primary evaporator.

4. A system as set forth in claim 3 wherein said auxiliary loop includes a first condensed refrigerant line extending between said condenser and said auxiliary evaporator.

5. A system as set forth in claim 4 wherein said primary loop includes a second condensed refrigerant line extending between said condenser and said heat exchanger such that warm liquid refrigerant from said condenser travels through said second condensed refrigerant line to said heat exchanger to warm the refrigerant in said auxiliary evaporator.

6. A system as set forth in claim 5 wherein said primary loop further includes a heat exchanger exit line extending between said heat exchanger and said primary evaporator for conveying the refrigerant from said heat exchanger to said primary evaporator.

7. A system as set forth in claim 6 wherein said auxiliary loop further includes an auxiliary evaporator exit line extending between said auxiliary evaporator and said compressor for conveying the refrigerant from said auxiliary evaporator to said compressor.

8. A system as set forth in claim 7 wherein said primary loop further includes a primary evaporator exit line extending between said primary evaporator and said compressor for conveying the refrigerant from said primary evaporator to said compressor.

9. A system as set forth in claim 8 further including a first expansion device in fluid communication with said first condensed refrigerant line for expanding the refrigerant from said condenser prior to the refrigerant entering said auxiliary evaporator.

10. A system as set forth in claim 9 further including a second expansion device in fluid communication with said heat exchanger exit line for expanding the refrigerant from said heat exchanger prior to the refrigerant entering said primary evaporator.

11. A system as set forth in claim 1 further including an auxiliary housing surrounding said auxiliary evaporator.

12. A system as set forth in claim 11 further including a plurality of auxiliary air duct housings extending from and engaging said auxiliary housing to define an auxiliary vent duct and an auxiliary floor duct.

13. A system as set forth in claim 12 further including a primary housing surrounding said primary evaporator.

14. A system as set forth in claim 13 further including a plurality of primary air duct housings extending from and engaging said primary housing to define a plurality of primary air ducts.

15. A system as set forth in claim 8 further including a tube defining multiple and fluidly separated paths wherein said first and second condensed refrigerant lines, said auxiliary evaporator exit line, and said heat exchanger exit line are integrated into said tube such that the refrigerant in each of said lines is conveyed through said fluidly separated paths.

16. A system as set forth in claim 1 wherein said heat exchanger engages an end of said auxiliary evaporator.

17. A system as set forth in claim 1 further including a coolant circuit having a first coolant loop parallel with a second coolant loop wherein said heat exchanger is in fluid communication with said coolant circuit for receiving coolant.

18. A system as set forth in claim 17 further including a pump in fluid communication with said coolant circuit for circulating the coolant.

19. A system as set forth in claim 18 further including a primary heater core in fluid communication with said first coolant loop for transferring heat from the coolant to the air.

20. A system as set forth in claim 19 further including an auxiliary heater core in fluid communication with said second coolant loop for transferring heat from the coolant to the air.

21. A system as set forth in claim 20 further including a third coolant loop in series with said second coolant loop having a heat exchanger entrance line for conveying the coolant from said auxiliary heater core to said heat exchanger.

22. A system as set forth in claim 21 wherein said third coolant loop further includes a heat exchanger exit line for conveying the coolant from said heat exchanger to said second coolant loop.

23. A system as set forth in claim 22 further including a first valve seated in said heat exchanger entrance line for controlling coolant flow between said auxiliary heater core and said heat exchanger.

24. A system as set forth in claim 23 further including first and second joints wherein said first joint fluidly connects said heat exchanger entrance line with said second coolant loop and said second joint fluidly connects said heat exchanger exit line with said second coolant loop.

25. A system as set forth in claim 24 further including a second valve seated in said second coolant loop between said first and second joints for controlling coolant flow.

26. A method of preventing accumulation of refrigerant in an auxiliary evaporator of an auxiliary air conditioning unit when the auxiliary air conditioning unit is in a non-cooling mode while a primary air conditioning unit is in a cooling mode and a compressor is compressing and circulating the refrigerant to both the auxiliary evaporator of the auxiliary air conditioning unit and a primary evaporator of the primary air conditioning unit, said method comprising the steps of:

operating the primary air conditioning unit in the cooling mode;

moving air across the primary evaporator in response to the primary air conditioning unit being in the cooling mode;

operating the auxiliary air conditioning unit in the cooling mode;

moving air across the auxiliary evaporator in response to the auxiliary air conditioning unit being in the cooling mode;

switching the auxiliary air conditioning unit from the cooling mode to the non-cooling mode while maintaining operation of the primary air conditioning unit in the cooling mode;

discontinuing the movement of air across the auxiliary evaporator in response to switching the auxiliary air conditioning unit from the cooling mode to the non-cooling mode; and warming the refrigerant in the auxiliary evaporator when the auxiliary air conditioning unit is in the non-cooling mode while the primary air conditioning unit is in the cooling mode.

27. A method as set forth in claim 26 further including the step of circulating the refrigerant in a refrigerant circuit from the condenser through both a heat exchanger proximate the auxiliary evaporator and the auxiliary evaporator.

28. A method as set forth in claim 26 further including the step of circulating coolant in a coolant circuit through both an auxiliary heater core and a heater exchanger proximate the auxiliary evaporator.

* * * * *